(12) United States Patent
Condon et al.

(10) Patent No.: US 10,331,861 B2
(45) Date of Patent: Jun. 25, 2019

(54) PIECEWISE ENCRYPTION FOR CONTENT IN PRINT JOBS

(71) Applicants: John Barker Condon, Corvallis, OR (US); Reinhard Heinrich Hohensee, Boulder, CO (US); Harry Reese Lewis, Longmont, CO (US)

(72) Inventors: John Barker Condon, Corvallis, OR (US); Reinhard Heinrich Hohensee, Boulder, CO (US); Harry Reese Lewis, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 337 days.

(21) Appl. No.: 15/362,006

(22) Filed: Nov. 28, 2016

(65) Prior Publication Data

US 2018/0150619 A1 May 31, 2018

(51) Int. Cl.
| | | |
|---|---|---|
| G06F 21/00 | (2013.01) | |
| G06F 21/10 | (2013.01) | |
| G06K 15/00 | (2006.01) | |
| H04L 9/14 | (2006.01) | |
| G06F 21/62 | (2013.01) | |
| H04L 9/16 | (2006.01) | |
| G06F 21/60 | (2013.01) | |

(52) U.S. Cl.
CPC ............ *G06F 21/10* (2013.01); *G06F 21/602* (2013.01); *G06F 21/608* (2013.01); *G06F 21/6245* (2013.01); *G06K 15/4095* (2013.01); *H04L 9/14* (2013.01); *H04L 9/16* (2013.01)

(58) Field of Classification Search
CPC ...... G06F 21/60; G06F 21/602; G06F 21/604; G06F 21/606; G06F 21/608; G06F 21/62; G06F 21/6209; G06F 21/6218; G06F 21/6227; H04L 9/08; H04L 9/088; H04L 9/14; H04L 9/16
See application file for complete search history.

(56) References Cited

U.S. PATENT DOCUMENTS

| | | |
|---|---|---|
| 7,624,284 B2 | 11/2009 | Lahey et al. |
| 7,853,017 B2 | 12/2010 | Iizuka |
| 8,302,001 B2 | 10/2012 | Mitsui |
| 8,904,283 B2 | 12/2014 | Condon et al. |

(Continued)

OTHER PUBLICATIONS

Contel Bradford; Storagecraft Recovery Zone; http://www.storagecraft.com/blog; 2016 StorageCraft Technology Corporation.

(Continued)

*Primary Examiner* — Edward Zee
(74) *Attorney, Agent, or Firm* — Duft & Bornsen, PC

(57) ABSTRACT

Systems and methods are provided for piecewise encryption of Page Description Language (PDL) print jobs. One embodiment is a method that includes receiving a Page Description Language (PDL) print job at a printer, wherein the print job includes segments of PDL content, and includes unencrypted PDL content. For each of the segments within the print job, the method includes detecting an identifier (ID) for the segment, correlating the ID with an encryption key stored at the printer, and decrypting the segment at the printer via the encryption key. The method further includes printing the print job, including each segment that has been decrypted.

20 Claims, 11 Drawing Sheets

(56) References Cited

U.S. PATENT DOCUMENTS

| | | | |
|---|---|---|---|
| 8,922,822 B2 | 12/2014 | Hinds | |
| 9,225,852 B2 | 12/2015 | Wagner | |
| 2004/0080772 A1 | 4/2004 | Snyders | |
| 2006/0050879 A1* | 3/2006 | Iizuka | G06F 21/608 380/51 |
| 2009/0225988 A1* | 9/2009 | Yamazaki | H04L 63/045 380/278 |
| 2013/0027739 A1 | 1/2013 | Gilg | |
| 2015/0220285 A1 | 8/2015 | Hohensee et al. | |

OTHER PUBLICATIONS

Intelligent Printer Data Stream Reference; AFP Consortuim 1987; Eleventh Edition Jun. 2014.
Lexmark PrintCryption; Firmware Version 1.3.1; FIPS 140-2 Non-Propietary Security Policy; Level 1 Validation Version 0.95; Apr. 2007.
Mixed Object Document Content Architecture (MO:DCA) Reference; AFPC-0004-08; Advanced Function Presentation Consortium, Data Stream and Object Architectures; Ninth Edition Jul. 2011.
Presentation Text Object Content Architecture Reference; AFPC-0009-03; Advanced Function Presentation Consortium, Data Stream and Object Architectures; Fourth Edition Mar. 2016.
White Paper-Levi, Ray & Shoup, Inc.; Securing Network Print Jobs; 2002.

* cited by examiner

FIG. 7

```
<BDT>
<MEN (LID 10, Key_nm_64)>
<MEN (LID 20, Key_nm_29)>
<MEN (LID 30, Key_nm_12)>
<BPT>
   <PTX>
      <TRN ("SSN:")>
      <BEN (LID=10, POSITION>
         <TRN ("aEfg7TVZ0Qp")>
      <EEN>
   <PTX>
      <TRN ("Phone #:")>
      <BEN (LID=20, POSITION)>
         <TRN ("En82jAbYavJ2q")>
      <EEN>
   <PTX>
      <TRN ("DOB:")>
      <BEN (LID=30, POSITION)>
         <TRN ("8Wmalvk71904")>
      <EEN>
<EPT>
<EDT>
```

<BDT>
<BDI>
   <IEL (OFFSET, EXTENT)>
      <X'83' (FLAG, ALGORITHM    , LOCAL ID 10, KEY 64)>
   <IEL (OFFSET, EXTENT)>
      <X'83' (FLAG, ALGORITHM    , LOCAL ID 20, KEY 29)>
   <IEL (OFFSET, EXTENT)>
      <X'83' (FLAG, ALGORITHM    , LOCAL ID 30, KEY 12)>
<EDI>

<BPG>
<BPT>
   <PTX>
      <TRN ("SSN:")>
         <TRN ("aEfg7TVZ0Qp")>
   <PTX>
      <TRN ("Phone #:")>
         <TRN ("En82jAbYavJ2q")>
   <PTX>
      <TRN ("DOB:")>
         <TRN ("8Wmalvk71904")>
   ...
<EPT>
...
<EPG>
<EDT>
```

PIECEWISE ENCRYPTION FOR CONTENT IN PRINT JOBS

FIELD OF THE INVENTION

The invention relates to the field of printing, and in particular to print jobs such as Advanced Function Printing (AFP) print jobs.

BACKGROUND

In the world of production printing, customers may be distantly located from print shops that provide volume printing services. Print shops may therefore provide for remote submission of print jobs via the Internet. This enables a customer to submit a large print job to the print shop via electronic means, substantially enhancing the convenience of production printing for the customer.

Many print jobs handled by a print shop include sensitive information. For example, a client may wish to submit a print job for printing out credit card statements for hundreds of thousands of customers. Those credit card statements may each include private account information for a customer. This presents a problem in that the Internet is not a secure transmission medium for print job data. The potential remains that a digitally submitted print job may be intercepted by malicious parties, resulting in the acquisition and misuse of sensitive information contained therein.

Thus, those skilled in the art continue to seek out enhanced systems for ensuring the security of sensitive content within print jobs.

SUMMARY

Embodiments described herein provide for print jobs that encrypt sensitive content on a piecewise basis. This means that certain parts of the print job remain encrypted, while other parts of the print job are not encrypted. This technique also allows for different pieces of content within a single print job to be encrypted using different encryption keys. Selectively encrypting print data on a piecewise basis ensures that sensitive content within the print job is protected while other content within the print job remains easily accessible. In this manner, a print shop operator may review unencrypted portions of the job to check for formatting issues and typos, while other content within the job remains encrypted. This piecewise encryption may be utilized throughout the lifecycle of the print job until immediately prior to printing. Thus, sensitive content in the print job may remain secured until the print job is physically printed.

One embodiment is a method that includes receiving a Page Description Language (PDL) print job at a printer, wherein the print job includes segments of PDL content, and includes unencrypted PDL content. For each of the segments within the print job, the method includes detecting an identifier (ID) for the segment, correlating the ID with an encryption key stored at the printer, and decrypting the segment at the printer via the encryption key. The method further includes printing the print job, including each segment that has been decrypted.

Another embodiment is a printer. The printer includes an interface that receives a Page Description Language (PDL) print job at a printer, wherein the print job includes segments of PDL content that are each encrypted, and includes unencrypted PDL content. The printer also includes a memory storing multiple encryption keys, and a controller that, for each of the segments within the print job: detects an identifier (ID) for the segment, correlates the ID with an encryption key stored at the printer, and decrypts the segment via the encryption key. The printer further includes a marking engine that prints the print job, including each segment that has been decrypted.

Another embodiment is a method. The method includes initiating creation of a Page Description Language (PDL) print job at a client, and selecting segments of PDL content for encryption within the print job. For each selected segment, the method includes selecting one of multiple encryption keys stored at the client, encrypting the segment via the encryption key, assigning an identifier (ID) to the segment, and including, within the print job, information correlating the ID with the encryption key. The method further includes transmitting the print job for printing, wherein the print job includes the encrypted segments of PDL content, and includes unencrypted PDL content.

Another embodiment is a system. The system includes a client. The client includes a memory that stores encryption keys, and a controller that initiates creation of a Page Description Language (PDL) print job, and selects segments of PDL content for encryption within the print job. For each selected segment, the controller selects one of multiple encryption keys from the memory, encrypts the segment via the encryption key, assigns an identifier (ID) to the segment, and includes, within the print job, information correlating the ID with the encryption key. The client also includes an interface that transmits the print job for printing, wherein the print job includes the encrypted segments of PDL content, and includes unencrypted PDL content.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

FIGS. 7, 8, and 9 are diagrams illustrating formats for selectively encrypting sensitive content within an AFP print job on a piecewise basis in an exemplary embodiment.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
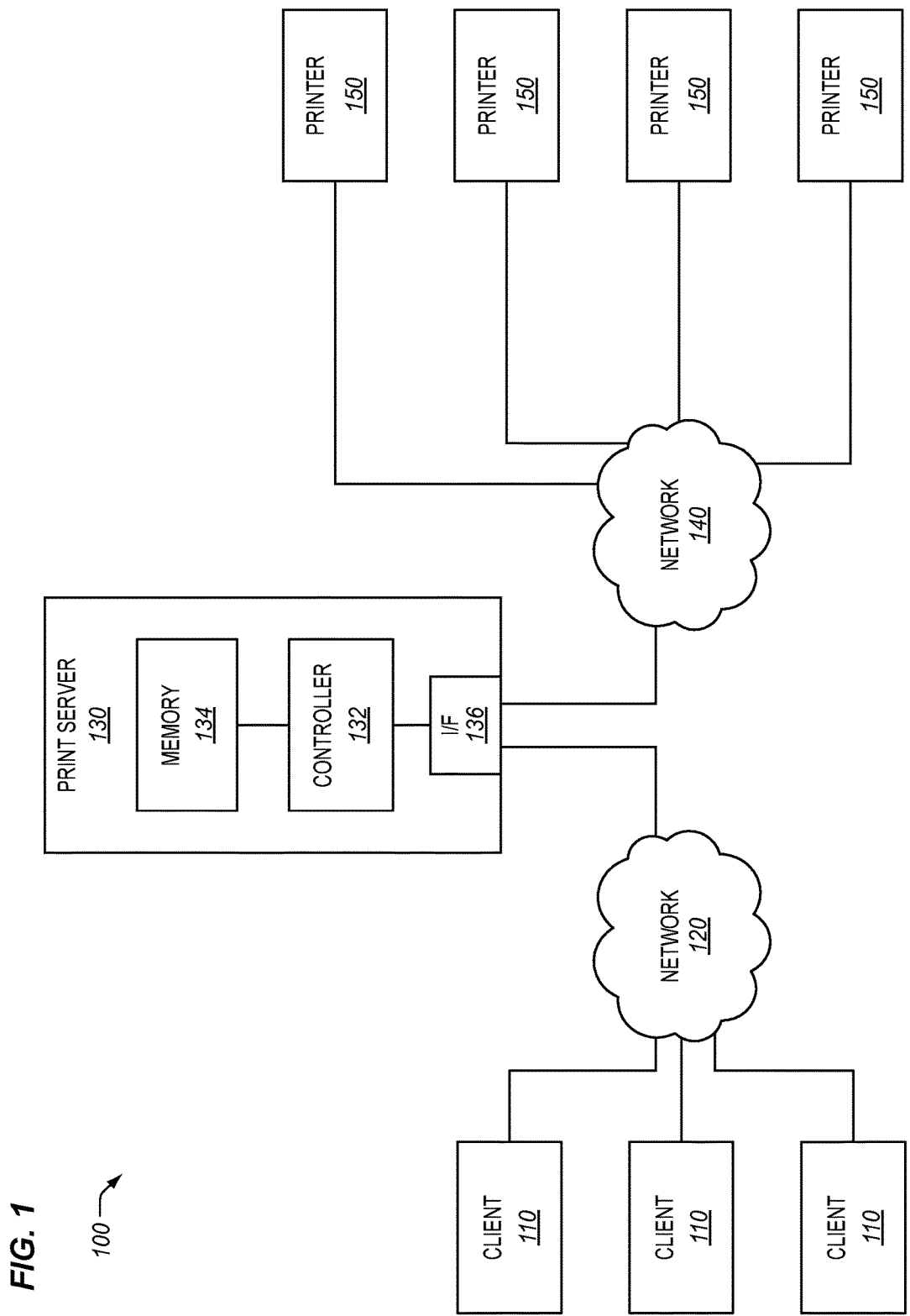
FIG. 1 is a block diagram of a printing environment in an exemplary embodiment.

FIG. 1 is a block diagram of printing environment 100 in an exemplary embodiment. Printing environment 100 comprises any combination of systems, devices, or components operable to encrypt and decrypt sensitive content within a Page Description Language (PDL) print job (e.g., an Advanced Function Presentation (AFP) print job) on a piecewise basis. This ensures that sensitive information is not maliciously acquired when the print jobs is transferred between parties.

In this embodiment, printing environment 100 includes clients 110, print server 130, and printers 150. These components are coupled with each other for communication via networks 120 and 140. Customers generate print jobs (e.g., AFP print jobs) at clients 110 and submit those print jobs to print server 130 for printing. AFP standards are discussed, for example, in the Mixed Object Document Content Architecture (MO:DCA) Reference (AFCP-0004-08), Ninth Edition (July 2011), issued by the AFP Consortium. Further standards are discussed, for example, in the Presentation Text Object Content Architecture Reference (AFPC-0009-03), Fourth Edition (March 2016), also issued by the AFP Consortium.

Print server 130 receives encrypted print jobs from clients 110 via network 120 at interface (I/F 136). I/F 136 may comprise an Ethernet port, Serial Attached Small Computer System Interface (SAS) port, or other suitable component for exchanging data. Networks 120 and 140 may comprise the Internet, a local network, etc. In further embodiments only one network is utilized instead of the two networks depicted in FIG. 1.

Controller 132 of print server 130 stores incoming print jobs in memory 134. Controller 132 further transmits print jobs to printers 150 via network 140. Any of the controllers discussed herein may be implemented as custom circuitry, as a processor executing programmed instructions, etc. Further details of the various components of printing environment 100 are described with regard to FIGS. 2-3.

Figure 2:
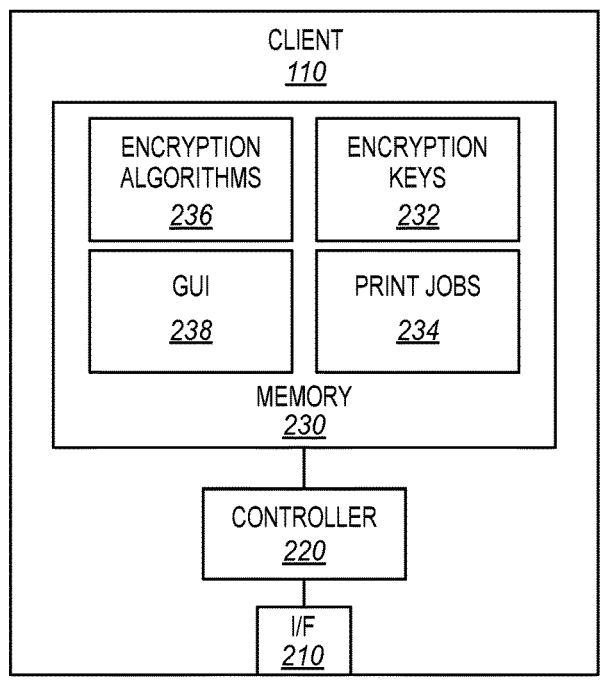
FIGS. 2-3 are block diagrams illustrating components of a printing environment in an exemplary embodiment.
Figure 3:
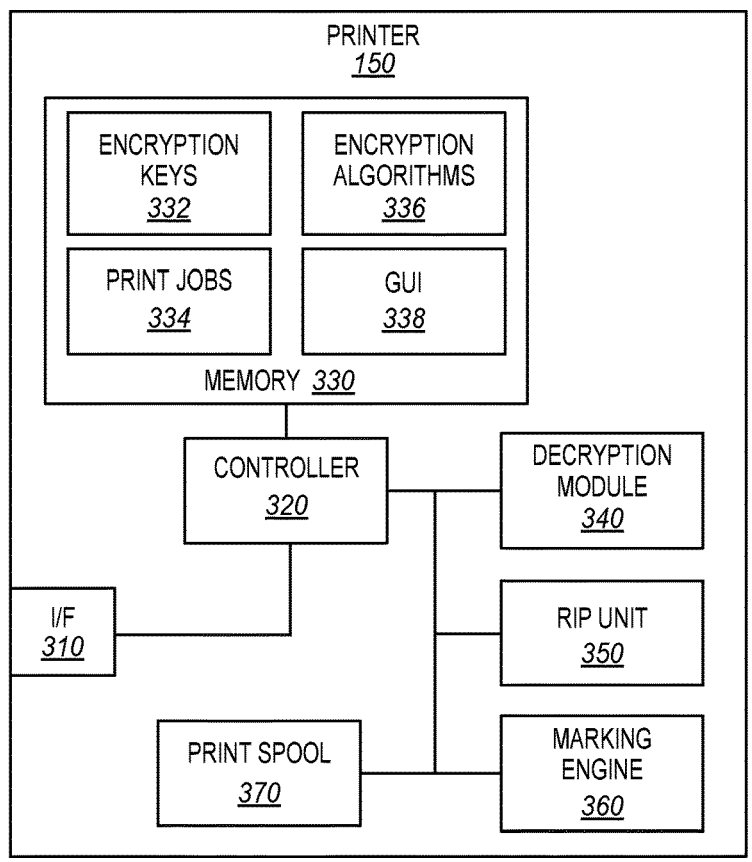

FIGS. 2-3 are block diagrams illustrating client 110 and printer 150 in an exemplary embodiment. FIG. 2 shows that client 110 includes I/F 210, controller 220, and memory 230. I/F 210 includes similar components to I/F 136 of print server 130. Controller 220 manages the operations of client 110 as client 110 generates, encrypts, and transmits print jobs. Memory 230 of client 110 stores encryption algorithms 236 for encrypting print data. Encryption algorithms 236 may include Data Encryption Standard (DES), Rivest-Shamir-Adleman cryptosystem (RSA), Advanced Encryption Standard (AES), and others. Memory 230 also includes encryption keys 232 for sharing with printers 150. These encryption keys 232 may be physically delivered to printers 150 via a flash memory storage device or may be exchanged with printers 150 via encrypted communications in order to ensure security. Each encryption key 232 may comprise a public or private key that is utilized by an encryption algorithm 236 to encrypt or decrypt PDL print data within a print job. Memory 230 also stores print jobs 234, as well as Graphical User Interface (GUI) 238. GUI 238 provides options enabling a customer to select an encryption method and key to use for each piece of sensitive content within a print job at client 110.

FIG. 3 illustrates printer 150. While client 110 includes components capable of generating and encrypting content within print jobs, printer 150 includes components capable of decrypting and printing content within print jobs. Printer 150 includes I/F 310, controller 320, and memory 330. I/F 310 is capable of receiving print jobs with encrypted content via network 140. I/F 130 includes similar components to I/F 136. Controller 320 manages the operations of printer 150 as printer 150 receives, decrypts, and prints the PDL contents of incoming print jobs. Memory 330 of printer 150 stores encryption algorithms 336 for decrypting PDL data within each print job. In one embodiment encryption algorithms 336 correspond with encryption algorithms 236 of client 110. Memory 330 also stores encryption keys 332. Each encryption key 332 corresponds with an encryption key 232 at client 110. For example, an encryption key 332 may comprise a public key that corresponds to or is paired with a private key 232 at client 110. Client 110 and printer 150 therefore store matched/paired keys in order to allow for successful decryption of segments/pieces of sensitive PDL content within a print job. Printer 150 further includes decryption module 340. Decryption module 340 utilizes keys 332 and algorithms 336 to perform decryption of incoming print jobs as described above. Decryption module 340 may be implemented as a hardware or software module as desired. In embodiments where decryption module 340 is implemented as hardware, keys 332 and algorithms 336 may be stored at decryption module 340 instead of memory 330.

Memory 330 also stores print jobs 334 and GUI 338. Piecewise content at print jobs 334 may remain encrypted as stored at memory 330 in order to maintain a high level of security. GUI 338 provides options for facilitating printing at printer 150. These options may provide for selection of print media, print quality. These options may further enable loading of encryption keys from a client 110 via a secured communication channel.

Rasterization Image Processor (RIP) unit 350, print spool 370, and marking engine 360 are also illustrated in FIG. 3. RIP unit 350 rasterizes print data existing in PDL format such as AFP and transforms that print data into bitmaps having pixels that correspond with specific locations on a printed page for marking. Print spool 370 stores rasterized data for use by marking engine 360. Marking engine 360 applies physical marks to a print medium such as paper in order to create a physical print job. This may include marking engine 360 applying ink to a page in order to physically print data from a print job.

The particular arrangement, number, and configuration of components described herein is exemplary and non-limiting. Illustrative details of the operation of printing environment 100 will be discussed with regard to FIG. 4. Assume that a customer wishes to generate print jobs that include sensitive PDL content that has been encrypted on a piecewise basis. Further assume that the customer wishes to transmit these print jobs to a print shop for printing.

Figure 4:
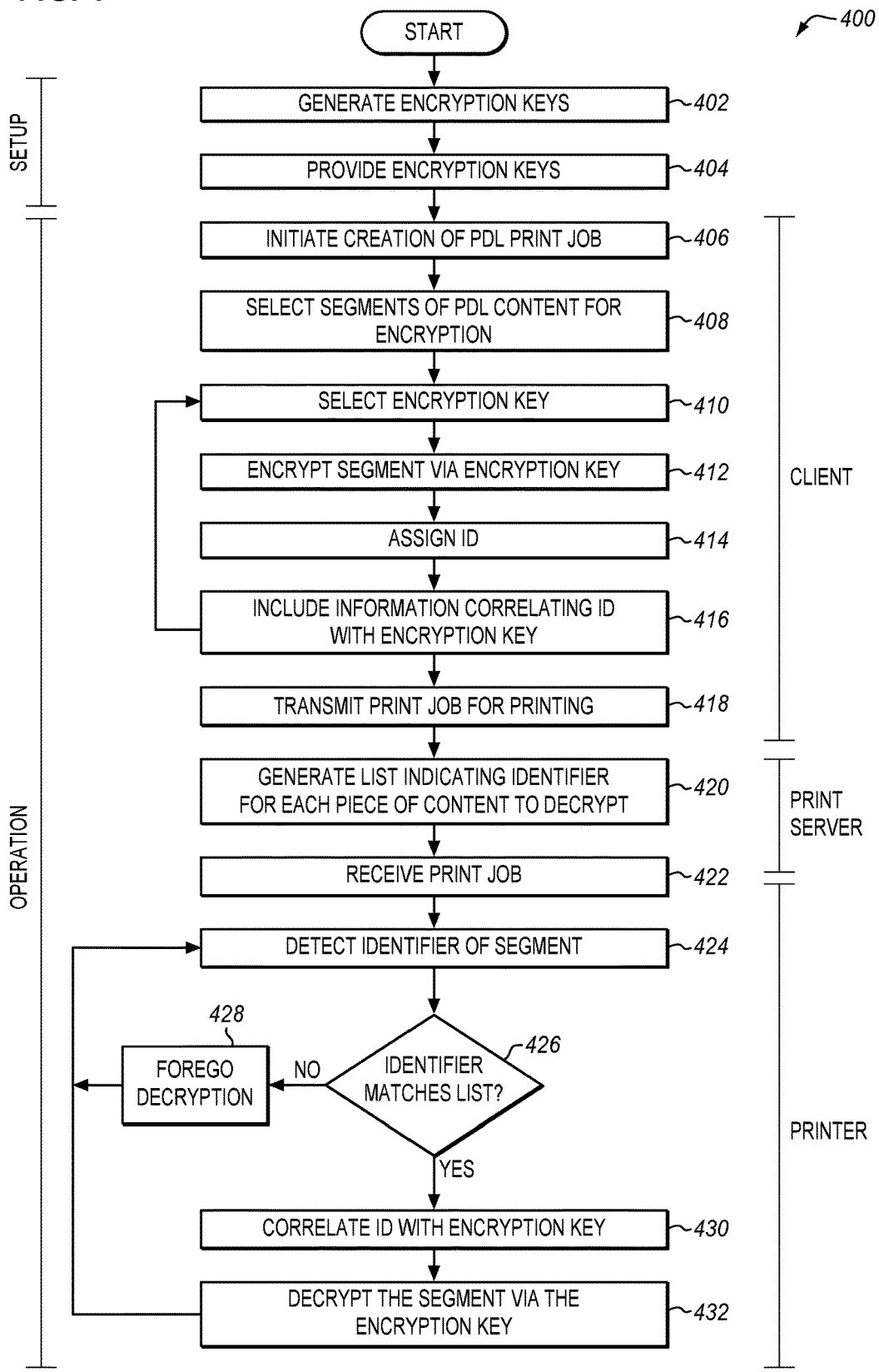
FIG. 4 is a flowchart illustrating a method for selectively encrypting sensitive segments of content within a print job in an exemplary embodiment.

FIG. 4 is a flowchart illustrating a method 400 for selectively encrypting segments of sensitive PDL content within a print job in an exemplary embodiment. The steps of method 400 are described with reference to printing environment 100 of FIG. 1, but those skilled in the art will appreciate that method 400 may be performed in other environments. The steps of the flowcharts described herein are not all inclusive and may include other steps not shown. The steps described herein may also be performed in an alternative order.

The processes described herein are separated into setup and operation. Steps 402-404 correspond with an initial setup process that may be performed in order to ensure that client 110 and printer 150 are capable of coordinating encryption and decryption processes. Steps 406-432 correspond with an operational process for encrypting and decrypting content within an AFP print job on a piecewise basis.

The setup process includes generating encryption keys (step 402). This may involve controller 220 utilizing an encryption algorithm 236 to generate a private key for use by client 110, and a public key for use by printers 150. The public key is paired with the private key. Alternatively, the setup process may involve generating a single key that is shared by both client 110 and printers 150. As used herein, encryption keys comprise parameters that help to define the output of an encryption algorithm engaged in encrypting or decrypting data. If content is encrypted using a first encryption key, use of an unrelated/unpaired key during decryption causes the cryptographic algorithm to output nonsensical data. The techniques described above for generating an encryption key may be utilized iteratively to generate many paired encryption keys as desired for sharing with printers 150.

The setup process further includes providing generated encryption keys to printers 150 (step 404). This may include storing multiple private keys at a client 110, and providing corresponding/paired public keys to printers 150. A printer may store multiple encryption keys for each client. Furthermore, a printer may store multiple sets of encryption keys, each set corresponding with a different client 110. The keys may be provided to printers 150 via a physical storage device (e.g., flash drive) or secured communication channel as desired.

With encryption keys successfully exchanged, clients 110 and printers 150 are capable of engaging in piecewise encryption and decryption of PDL content with print jobs. Operations are therefore initiated at clients 110 in order to generate encrypted print jobs for printing by printers 150.

A client 110 initiates creation of a PDL (e.g., AFP) print job, which may include allocating space in memory 230 for the print job, generating a blank file for storing content within the print job, etc. (step 406). The client 110 further selects segments of sensitive (e.g., private) PDL content for encryption (step 408). This may be performed based on input from a user of client 110, or may be an automated process based on a set of stored criteria in memory. Controller 220 proceeds to select an encryption key 232 and/or algorithm 236 for encrypting one of the selected segments (step 410). The process further involves utilizing the selected key 232 and algorithm 236 to convert the segment of unencrypted PDL content (e.g., plain text or a picture) into an encrypted format (step 412). Different keys may be used to encrypt different segments. Segments that store a similar category of information in the print job, such as segments that store a Social Security Number or a telephone number, may optionally be encrypted using the same encryption keys and algorithms. This configuration enables selective decryption of specific types of content at printer 150 as desired. After encryption has completed, each encrypted segment is stored within the print job in an encrypted format. Thus, the original unencrypted PDL data within the segment cannot be retrieved without the use of the proper encryption key. This means that sensitive information within the encrypted segment cannot be retrieved by malicious parties.

Client 110 proceeds to assign an identifier (ID) to the encrypted segment (step 414). The ID may be placed in AFP structured fields that bound the segment. For example, the ID may be placed inside of a Begin Encryption (BEN) structured field within the PDL of the print job. The ID may uniquely identify the segment within the print job. The ID may even be unique on a category-by-category basis within the print job. Client 110 correlates the ID of the segment with the encryption key utilized to encrypt that segment. Client 110 further includes information in the print job that correlates the ID for the segment with the encryption key used to encrypt that segment (step 416). These correlations may be stored in an AFP structure within the print job. In one embodiment, the correlations are stored within a Map Encrypted Data (MEN) structured field within PDL data for the print job. The AFP structure itself need not be encrypted. Even though the AFP structure may plainly list which encryption keys were used to encrypt each individual pieces of content, the encryption keys are not available to any parties except for client 110 and printer 150. This means that not even print server 130 is capable of decrypting pieces of content from print jobs sent by client 110. Steps 410-416 may be repeated for each segment of PDL content selected for encryption.

Client 110 may further generate parameters indicating what pieces of sensitive content should be decrypted during printing, and proceeds to transmit the encrypted print job to print server 130 for printing (step 418).

Print server 130 receives the encrypted print job. At this juncture the entirety of the print job has not been encrypted. Rather, segments of sensitive PDL content within the print job have been encrypted, while other segments of PDL content remain unencrypted. This means that sensitive content cannot be stolen even if the print job was maliciously intercepted during transit across network 120. The selective encryption of the print job provides a further benefit in that it allows a user of print server 130 to generate a print preview for reviewing unencrypted portions of the print job. Simply put, portions of the print job that are not sensitive (e.g., mere headers and labels) can be viewed by a user of print server 130 without decrypting the print job.

Print server 130 identifies pieces of content to decrypt. These pieces of content may be chosen based on input from a user at print server 130. These pieces of content may even be chosen based on input from a customer via client 110. Print server 130 further generates a list indicating the identifier for each piece of content to decrypt in the print job (step 420). This list may be generated as an AFP FormDef or other job ticket. Print server 130 further transmits the print job to printer 150 via network 140. The list may be transmitted to printer 150 via Intelligent Printer Data Stream (IPDS) communications. In a further embodiment, a sideband channel such as via Simple Network Management Protocol (SNMP) communications may be used to provide the list.

Printer 150 receives the print job from network 140 (step 422). Printer 150 also reviews the list generated by print server 130. The list affirmatively identifies segments of PDL content for decryption. With the print job and list received, printer 150 proceeds to decrypt and print the print job. This includes printer 150 reviewing a segment of encrypted PDL content within the print job in order to detect its ID (step 424). Printer 150 proceeds to determine whether the ID for the segment matches an ID in the list from print server 130 (step 426). If the ID of the segment matches an ID in the list (step 426), printer 150 correlates the ID of the segment with the encryption key used to encrypt the segment (step 430). Printer 150 then decrypts the segment based on the encryption key that was originally used to encrypt the segment (step 432). This means that printer 150 retrieves the appropriate encryption key 332 from memory 330. Printer 150 further engages in decryption of the selected piece of content. The encryption key 332 that is retrieved is an encryption key that is paired with (or otherwise matches) the encryption key 232 used to originally encrypt that piece of content.

Alternatively, if the ID does not match an ID in the list from print server 130, printer 150 foregoes decryption of the piece of content (step 428). The process may loop back to step 424 as each segment is detected by printer 150 within the print job.

This form of selective encryption and decryption may be particularly beneficial for large print jobs that engage in multiple test prints. Specifically, these techniques may be used to ensure that sensitive data is not unintentionally revealed to a print shop operator during a test print. If printer 150 foregoes decryption of a segment, printer 150 may print the encrypted data as encrypted, may forego printing of the encrypted data, or may even print a label such as "PRIVATE" in place of the encrypted content.

Printer 150 then proceeds to rasterize and print the print job including all decrypted PDL content. Utilizing method 400 provides a substantial benefit over prior systems in that it allows for encryption of print data on a piecewise basis. The provides a dual benefit in that it secures sensitive content at the print job while still allowing the print job to be previewed and reviewed for errors in unencrypted content.

Figure 5:
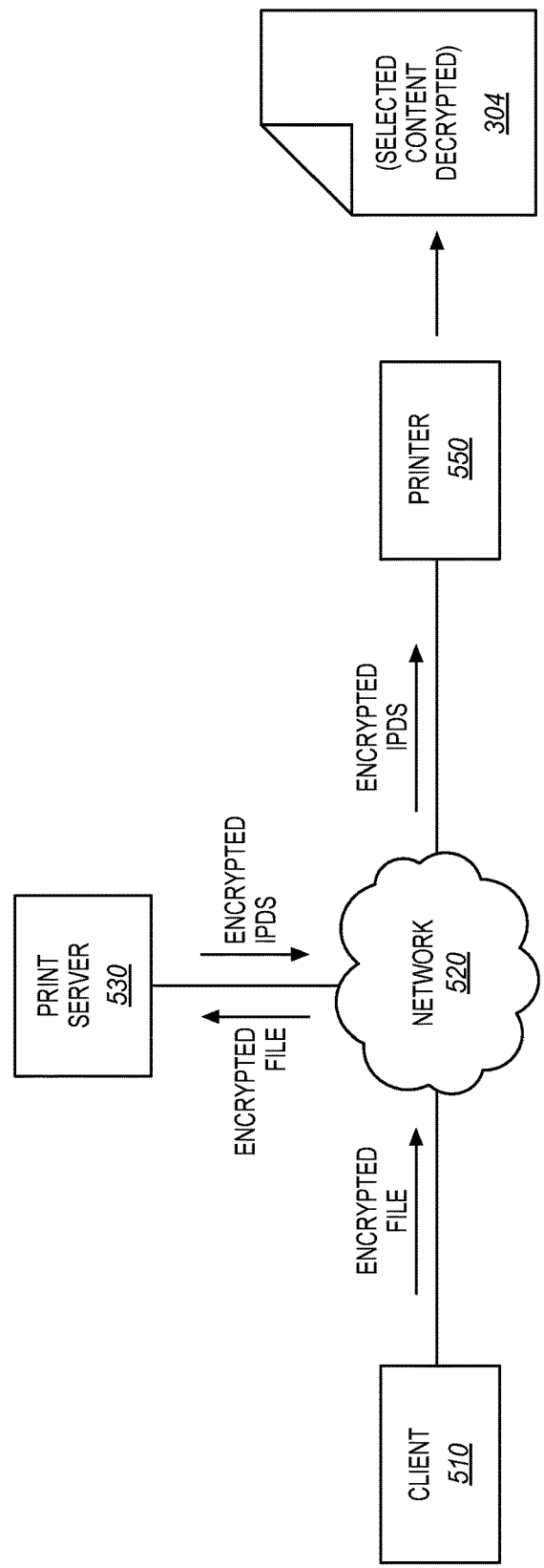
FIG. 5 is a block diagram summarizing the format of an in-transit print job in an exemplary embodiment.
Figure 6:
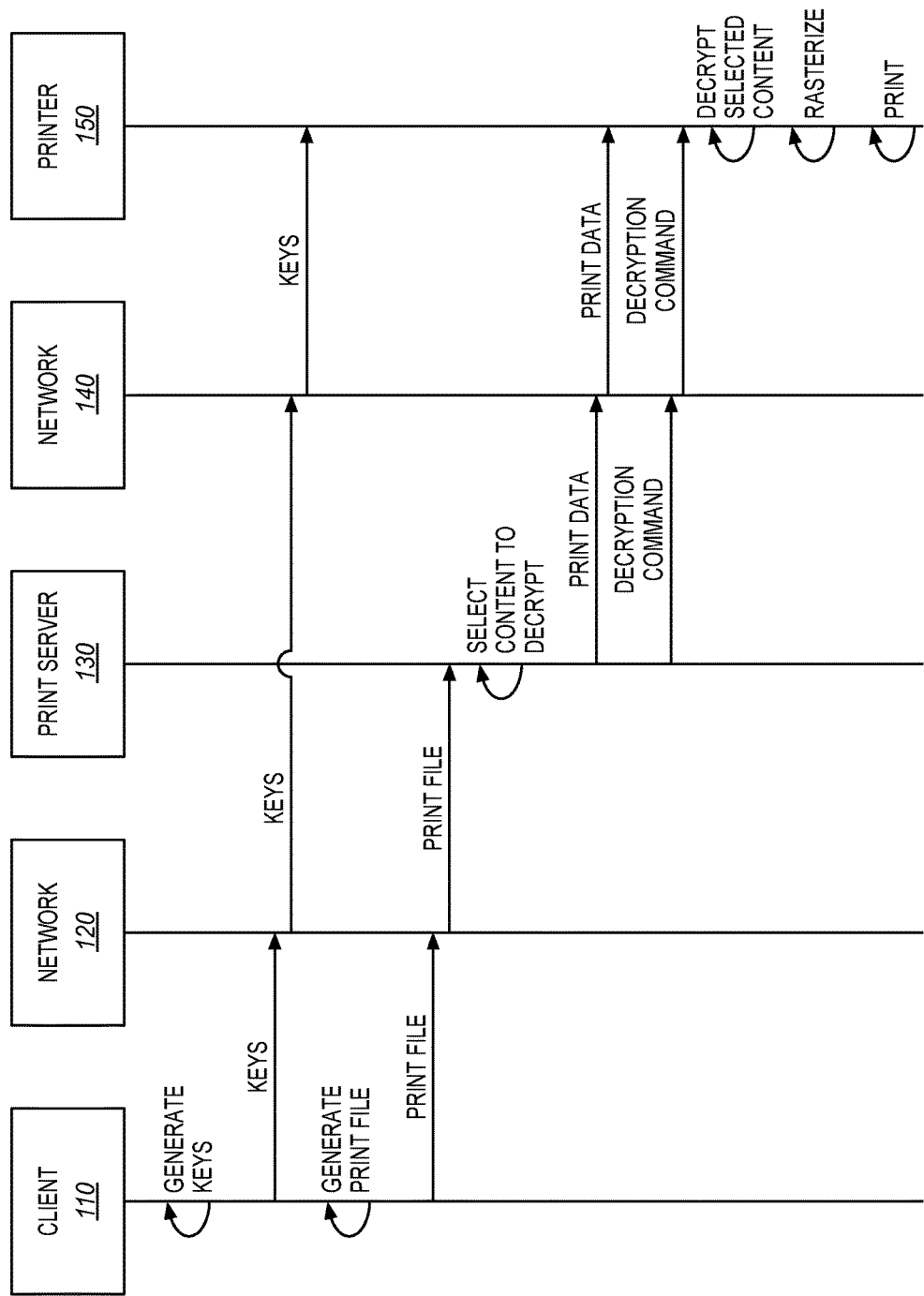
FIG. 6 is a message diagram illustrating selectively encrypting sensitive content within an AFP print job on a piecewise basis in an exemplary embodiment.

FIGS. 5-6 further illustrate the operations discussed above with regard to method 400 of FIG. 4. FIG. 5 is a block diagram summarizing the format of an in-transit print job in an exemplary embodiment. FIG. 5 illustrates that a client 510 generates an AFP print job as a piecewise encrypted AFP file. Client 510 transmits the encrypted file via network 520 to print server 530. Print server 530 converts the piecewise encrypted AFP file into IPDS accompanied by an AFP FormDef. This encrypted IPDS data is then received at printer 550 for decryption and printing. IPDS standards are discussed, for example, in the Intelligent Printer Data Stream Reference (AFCP-0001-10) Eleventh Edition, issued June 2014 by the AFP Consortium.

FIG. 6 is a message diagram illustrating selectively encrypting sensitive content within an AFP print job on a piecewise basis in an exemplary embodiment. FIG. 6 illustrates that keys may be generated at client 110, and distributed via an encrypted communication channel via networks 120 and 140 to printer 150. The encrypted communication channel may comprise a Secure Shell (SSH) communication channel, or other cryptographic network protocol. Client 110 further generates a piecewise encrypted print file and sends the print file to print server 130. A user at print server 130 selects which segments of the print file to decrypt. Print server 130 then transmits the print data for the print job along with a decryption command identifying the IDs of segments to decrypt. At printer 150, the identified segments are decrypted, the print job is rasterized, and the print job is printed.

EXAMPLES

In the following examples, additional processes, systems, and methods are described in the context of a printing environment that engages in piecewise encryption and decryption of content within AFP print jobs.

Figure 9:
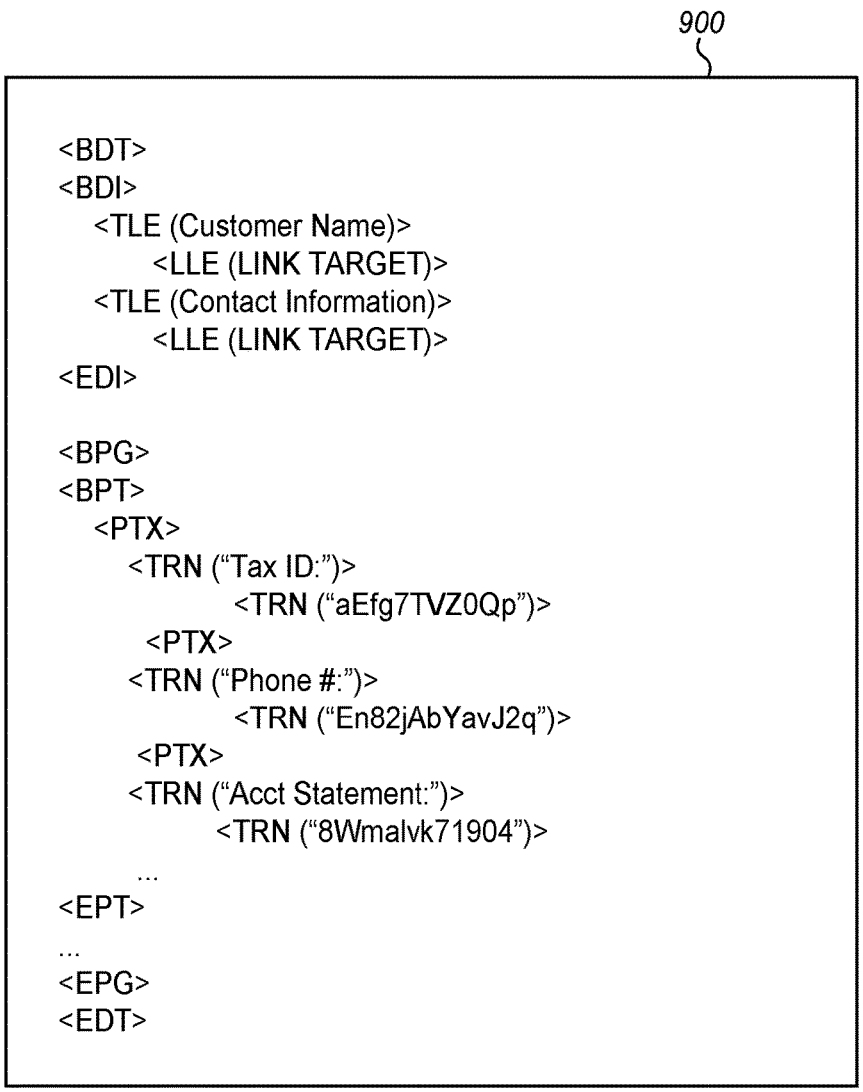

FIGS. 7-9 are diagrams illustrating formats for selectively encrypting sensitive content within an AFP print job on a piecewise basis in an exemplary embodiment. The formats of FIGS. 7-9 illustrate arrangements of PDL data for each print job. According to the first example print job 700 shown in FIG. 7, an AFP structure comprising a series of Map Encrypted Data (MEN) structured fields are utilized following the Begin Document (BDT) structured field of an AFP print job. Each MEN structured field includes a pair of attributes listing a Local Identifier (LID) as well as a key identifier for a piece of encrypted AFP content. The MEN may also include an X'83' triplet that indicates the encryption algorithm used (as described below with regard to FIG. 8). The encrypted content is bounded by a Begin Presentation Text (BPT) structured field and an End Presentation Text (EPT) structured field. Specifically, encrypted data is maintained within one or more Transparent Data (TRN) structured fields. Each TRN structured field storing piece of encrypted content kept is associated with an identifier indicated in a Begin Encryption (BEN) field preceding the TRN. An End Encryption (EEN) structured field signifies the end of a portion of encrypted content comprising one or more TRNs.

FIG. 8 illustrates a further exemplary print job 800 for storing encrypted AFP content on a piecewise basis. According to FIG. 8, an AFP structure correlating LIDs with keys is found as a series of Index Element (IEL) structured fields bounded by a Begin Document Index (BDI) structured field and an End Document Index (EDI) structured field. Each IEL defines a byte offset indicating the start of a piece of encrypted content (e.g., the start of a BEN structured field or TRN structured field), and further indicates an extent (i.e. size/length) of the encrypted content in bytes. The byte offset therefore uniquely distinguishes pieces of encrypted content from each other. Each IEL further includes an encoded triplet such as an X'83' triplet. The X'83' triplet includes an encryption algorithm used to encrypt the data, as well as a key identifier corresponding to the data. This information in each IEL and X'83' triplet may be utilized by printer 150 in order to accurately and efficiently decrypt data within the print job. The format of print job 800 otherwise matches that of print job 700 of FIG. 7.

FIG. 9 illustrates yet another exemplary print job 900 for storing encrypted AFP content on a piecewise basis. In print job 900, the location of each segment is indicated in Tagged Logical Element (TLE) structured fields that are bounded by a Begin Document Index (BDI) structured field and an End Document Index (EDI) structured field. Each TLE identifies a name of a segment of encrypted content within the print job. Each TLE is also accompanied by a Link Logical Element (LLE) that links to a corresponding encrypted segment of PDL content within the print job.

Figure 10:
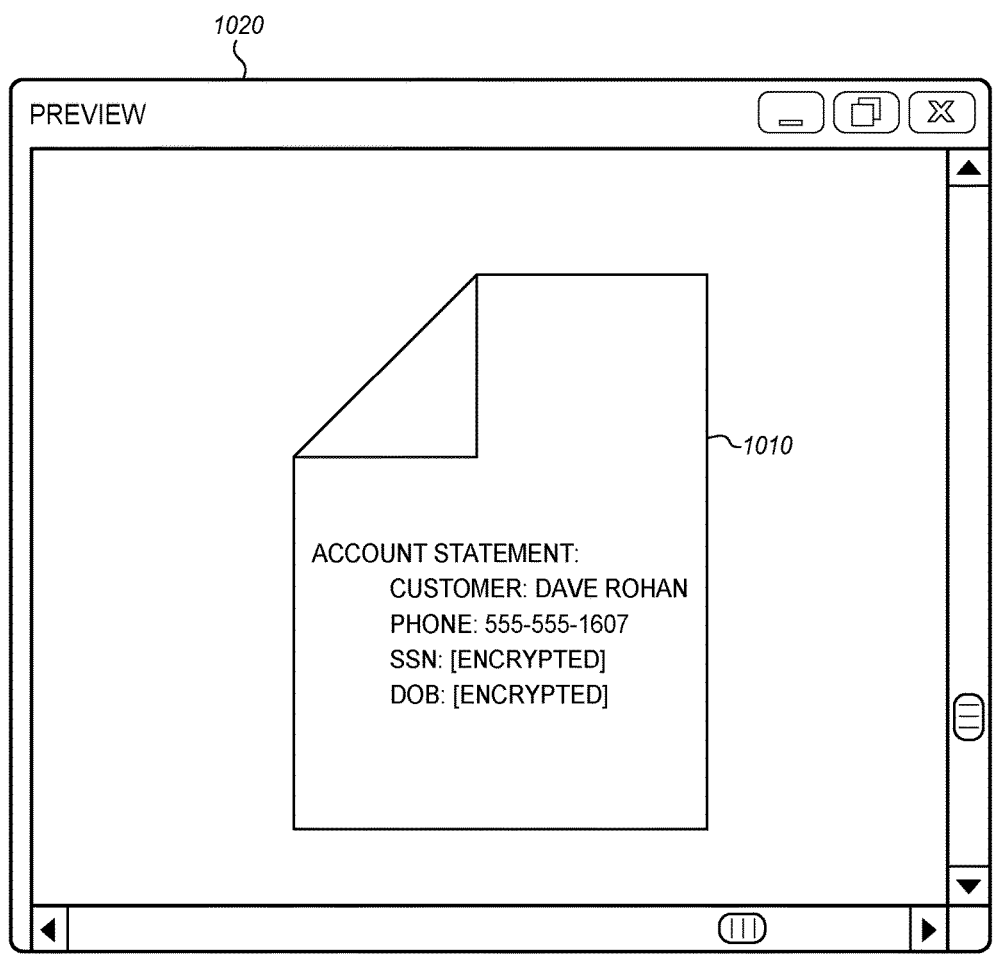
FIG. 10 is a diagram illustrating a print preview of a print job that includes piecewise encrypted content in an exemplary embodiment.

FIG. 10 is a diagram illustrating a print preview of a print job that includes piecewise encrypted content in an exemplary embodiment. The print preview may be generated at client 110, print server 130, or printer 150. The print preview depicts an account statement, and encrypted pieces of content are replaced with text reading "ENCRYPTED." Even if the print job was reviewed utilizing an editor application illustrating raw PDL data within the print job, the sensitive pieces of content would remain unavailable.

Figure 11:
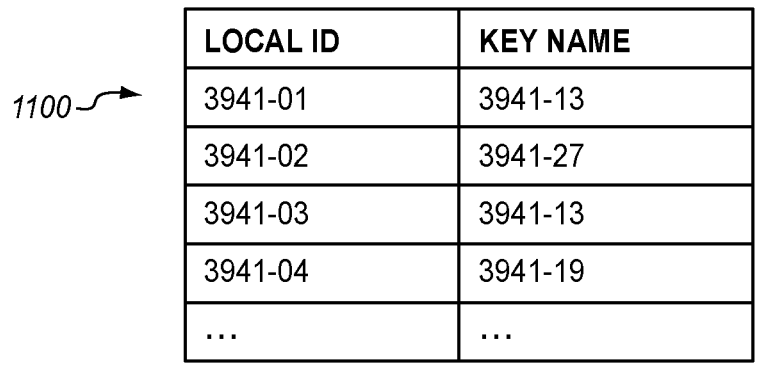
FIG. 11 is a diagram illustrating an AFP structure mapping segments of sensitive content to decryption keys in an exemplary embodiment.
Figure 12:
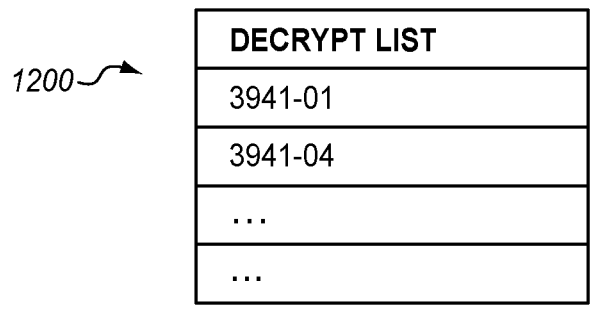
FIG. 12 is a diagram illustrating a list defining which segments of a print job to decrypt in an exemplary embodiment.

FIG. 11 is a diagram illustrating an AFP structure 1100 mapping segments of sensitive content to decryption keys in an exemplary embodiment. AFP structure 1100 is illustrated as a table mapping IDs for segments to key names. AFP structure 1100 may be generated at printer 150 as an initial step preceding decryption. FIG. 12 is a diagram illustrating a list 1200 defining which pieces of sensitive content to decrypt in an exemplary embodiment. The information in list 1200 may be transmitted to printer 150 from print server 130 via IPDS prior to printing.

Figure 13:
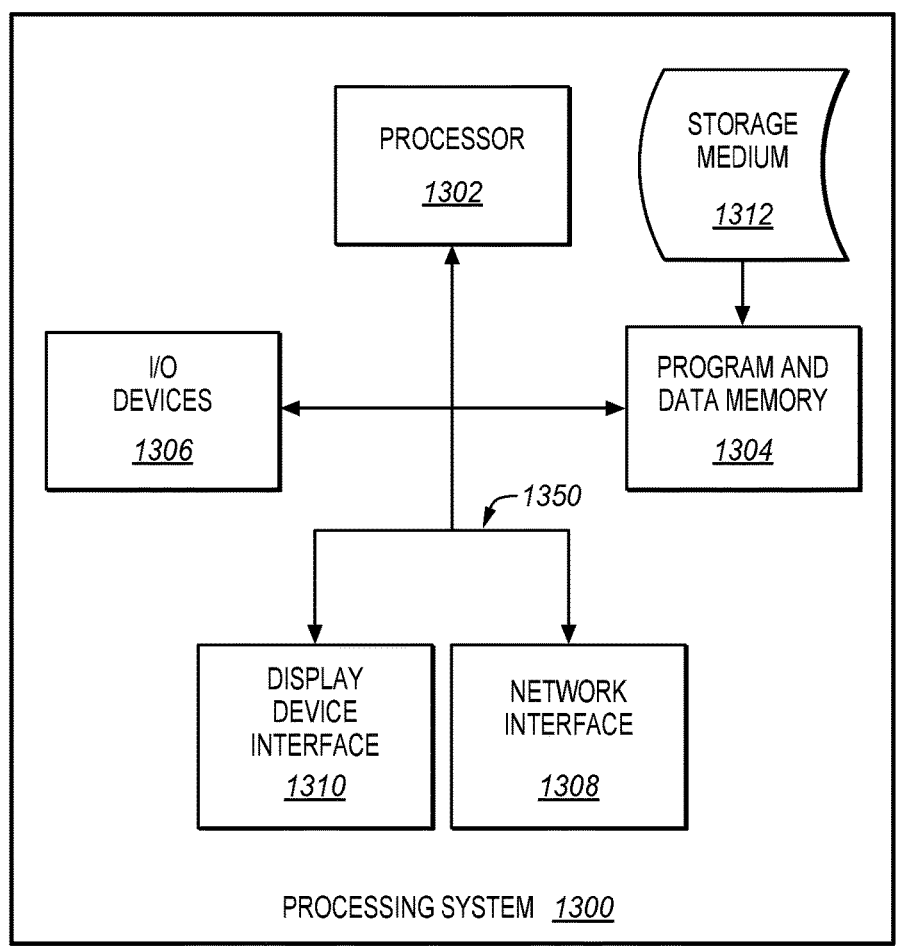
FIG. 13 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of a print server, client, or printer to perform the various operations disclosed herein. FIG. 13 illustrates a processing system 1300 operable to execute a computer readable medium embodying programmed instructions to perform desired functions in an exemplary embodiment. Processing system 1300 is operable to perform the above operations by executing programmed instructions tangibly embodied on computer readable storage medium 1312. In this regard, embodiments of the invention can take the form of a computer program accessible via computer-readable medium 1312 providing program code for use by a computer or any other instruction execution system. For the purposes of this description, computer readable storage medium 1312 can be anything that can contain or store the program for use by the computer.

Computer readable storage medium 1312 can be an electronic, magnetic, optical, electromagnetic, infrared, or semiconductor device. Examples of computer readable storage medium 1312 include a solid state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Processing system 1300, being suitable for storing and/or executing the program code, includes at least one processor 1302 coupled to program and data memory 1304 through a system bus 1350. Program and data memory 1304 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 1306 (including but not limited to keyboards, displays, pointing devices, etc.) can be coupled either directly or through intervening I/O controllers. Network adapter interfaces 1308 may also be integrated with the system to enable processing system 1300 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 1310 may be integrated with the system to interface to one or more display devices, such as printing systems and screens for presentation of data generated by processor 1302.

Although specific embodiments were described herein, the scope of the invention is not limited to those specific embodiments. The scope of the invention is defined by the following claims and any equivalents thereof.

We claim:

1. A method comprising:
receiving a Page Description Language (PDL) print job at a printer, wherein the print job includes segments of encrypted PDL content that are each accompanied by an identifier (ID), and also includes unencrypted PDL content, wherein each of the IDs is correlated with an encryption key, and different identifiers (IDs) are correlated with different encryption keys;
receiving a list of IDs;
for each of the segments of encrypted PDL content within the print job:
   detecting an ID for the segment of encrypted PDL content;
   determining whether the ID for the segment of encrypted PDL content matches an ID in the list;
   decrypting the segment of encrypted PDL content at the printer via its correlated encryption key if the ID for the segment of encrypted PDL content matches an ID in the list; and
   foregoing decrypting of the segment of encrypted PDL content if the ID for the segment of encrypted PDL content does not match an ID in the list; and
printing the print job, including each segment of encrypted PDL content that has been decrypted, and further including segments of PDL content that remain encrypted.

2. The method of claim 1 wherein:
the print job comprises an Advanced Function Presentation (AFP) print job; and
the IDs that accompany the segments of encrypted PDL content are correlated with the encryption keys in a Map Encrypted Data (MEN) structured field.

3. The method of claim 1 wherein:
the print job comprises an Advanced Function Presentation (AFP) print job; and
the IDs that accompany the segments of encrypted PDL content are correlated with the encryption keys in Index Element (IEL) structured fields that are bounded by a Begin Document Index (BDI) structured field and an End Document Index (EDI) structured field.

4. The method of claim 1 wherein:
the print job comprises an Advanced Function Presentation (AFP) print job; and
the segments of encrypted PDL content are stored within Transparent Data (TRN) structured fields that are bounded by a Begin Encryption (BEN) structured field and an End Encryption (EEN) structured field.

5. The method of claim 1 wherein:
segments of encrypted PDL content within the print job that store the same category of information are encrypted using the same encryption key.

6. The method of claim 1 wherein:
the location of each piece of content is indicated by a byte offset within the print job, and
the length of each piece of content is indicated by an extent within the print job.

7. The method of claim 1 wherein:
the encryption keys stored at the printer are paired with encryption keys at a client that generated the print job.

8. A printer comprising:
an interface that receives a Page Description Language (PDL) print job at a printer, wherein the print job includes segments of encrypted PDL content that are each accompanied by an identifier (ID), and also includes unencrypted PDL content, wherein each of the identifiers (IDs) is correlated with an encryption key, different IDs are correlated with different encryption keys, and the interface further receives a list of IDs;
a memory storing multiple encryption keys;
a controller that, for each of the segments of encrypted PDL content within the print job: detects an ID for the segment of encrypted PDL content, determines whether the ID for the segment of encrypted PDL content matches an ID in the list, and decrypts the segment of encrypted PDL content via its correlated encryption key if the ID for the segment of encrypted PDL content matches an ID in the list, and foregoes decrypting of the segment of encrypted PDL content if the ID for the segment of encrypted PDL content does not match an ID in the list; and
a marking engine that prints the print job, including each segment of encrypted PDL content that has been decrypted, and further including segments of PDL content that remain encrypted.

9. The printer of claim 8 wherein:
the print job comprises an Advanced Function Presentation (AFP) print job; and
the IDs that accompany the segments of encrypted PDL content are correlated with the encryption keys in a Map Encrypted Data (MEN) structured field.

10. The printer of claim 8 wherein:
the print job comprises an Advanced Function Presentation (AFP) print job; and
the IDs that accompany the segments of encrypted PDL content are correlated with the encryption keys in Index Element (IEL) structured fields that are bounded by a Begin Document Index (BDI) structured field and an End Document Index (EDI) structured field.

11. A method comprising:
initiating creation of a Page Description Language (PDL) print job at a client;
selecting segments of PDL content for encryption within the print job; and
for each selected segment:
    selecting one of multiple encryption keys stored at the client;
    encrypting the segment via the selected encryption key;
    assigning an identifier (ID) to the segment; and
    including, within the print job, information correlating the ID with the selected encryption key;
transmitting the print job for printing, wherein the print job includes the encrypted segments of PDL content, and includes unencrypted PDL content; and
transmitting a list comprising identifier (IDs) for decrypting less than all of the selected segments.

12. The method of claim 11 wherein:
the print job comprises an Advanced Function Presentation (AFP) print job; and
the IDs are correlated with the encryption keys in a Map Encrypted Data (MEN) structured field.

13. The method of claim 11 wherein:
the print job comprises an Advanced Function Presentation (AFP) print job; and
the IDs are correlated with the encryption keys in Index Element (IEL) structured fields that are bounded by a Begin Document Index (BDI) structured field and an End Document Index (EDI) structured field.

14. The method of claim 11 wherein:
the print job comprises an Advanced Function Presentation (AFP) print job; and
the segments are stored within Transparent Data (TRN) structured fields that are bounded by a Begin Encryption (BEN) structured field and an End Encryption (EEN) structured field.

15. The method of claim 11 wherein:
the location of each piece of content is indicated by a byte offset within the print job, and
the length of each piece of content is indicated by an extent within the print job.

16. The method of claim 11 wherein:
the encryption keys stored at the client are paired with encryption keys at a printer that will print the print job.

17. A system comprising:
a client comprising:
    a memory that stores multiple encryption keys;
    a controller that initiates creation of a Page Description Language (PDL) print job, selects segments of PDL content for encryption within the print job, and for each selected segment: selects one of the multiple encryption keys from the memory, encrypts the segment via the selected encryption key, assigns an identifier (ID) to the segment, and includes, within the print job, information correlating the ID with the selected encryption key; and
    an interface that transmits the print job for printing, wherein the print job includes the encrypted segments of PDL content, and includes unencrypted PDL content and that transmits a list comprising identifier (IDs) for decrypting less than all of the selected segments.

18. The system of claim 17 wherein:
the print job comprises an Advanced Function Presentation (AFP) print job; and
correlated with one of the encryption keys in a Map Encrypted Data (MEN) structured field.

19. The system of claim 17 wherein:
the print job comprises an Advanced Function Presentation (AFP) print job; and
accompanied by identifiers (IDs) correlated with one of the encryption keys in an Index Element (IEL) structured field that is bounded by a Begin Document Index (BDI) structured field and an End Document Index (EDI) structured field.

20. The system of claim 17 wherein:
the print job comprises an Advanced Function Presentation (AFP) print job; and
the segments are stored within Transparent Data (TRN) structured fields that are bounded by a Begin Encryption (BEN) structured field and an End Encryption (EEN) structured field.

* * * * *